United States Patent
Janich et al.

(10) Patent No.: US 8,091,858 B2
(45) Date of Patent: Jan. 10, 2012

(54) SHUT-OFF SYSTEM FOR LARGE CONDUIT CROSS-SECTIONS, HAVING A SWING FLAP

(75) Inventors: Hans-Jürgen Janich, Grub am Forst (DE); Matthias Krüger, Effelder-Rauenstein (DE)

(73) Assignee: Janich GmbH & Co. KG, Rauenstein (DE)

( * ) Notice: Subject to any disclaimer, the term of this patent is extended or adjusted under 35 U.S.C. 154(b) by 952 days.

(21) Appl. No.: 12/060,963

(22) Filed: Apr. 2, 2008

(65) Prior Publication Data

US 2008/0245431 A1  Oct. 9, 2008

(30) Foreign Application Priority Data

Apr. 5, 2007 (DE) .......................... 10 2007 016 554

(51) Int. Cl.
*F16K 31/12* (2006.01)
*F16K 1/00* (2006.01)
*F16K 1/16* (2006.01)
*F16K 31/44* (2006.01)

(52) U.S. Cl. .................. 251/58; 137/875; 251/279

(58) Field of Classification Search .............. 251/14, 251/56, 57, 58, 59, 60, 62, 77, 78, 81, 89.5, 251/190, 208, 228, 232, 235, 279, 280, 284, 251/285, 288, 356; 137/488, 875
See application file for complete search history.

(56) References Cited

U.S. PATENT DOCUMENTS

| | | | | |
|---|---|---|---|---|
| 3,647,182 A | * | 3/1972 | Boudot et al. | 251/361 |
| 3,720,138 A | | 3/1973 | Van Scoy | |
| 4,190,074 A | * | 2/1980 | Mailliet et al. | 137/315.16 |
| 4,412,556 A | * | 11/1983 | Janich | 137/614.11 |
| 4,570,900 A | * | 2/1986 | Lonardi et al. | 251/58 |
| 4,844,292 A | * | 7/1989 | Lonardi et al. | 222/503 |
| 5,109,883 A | * | 5/1992 | Squirrell | 137/385 |
| 5,159,954 A | * | 11/1992 | Janich | 137/557 |
| 5,697,596 A | * | 12/1997 | Kremers et al. | 251/58 |
| 6,086,038 A | * | 7/2000 | Ma | 251/58 |
| 6,385,870 B1 | * | 5/2002 | Webel et al. | 37/406 |
| 6,443,425 B1 | * | 9/2002 | von Erichsen | 251/279 |

FOREIGN PATENT DOCUMENTS

| | | |
|---|---|---|
| DE | 4135182 | 4/1993 |
| DE | 9304957 | 7/1993 |
| EP | 0482310 | 4/1992 |
| FR | 2633365 | 12/1989 |

* cited by examiner

*Primary Examiner* — Stephen M Hepperle
*Assistant Examiner* — Hailey K Do
(74) *Attorney, Agent, or Firm* — Stites & Harbison PLLC; Douglas E. Jackson (57) ABSTRACT

The shut-off system according to the invention for large conduit cross-sections has a swing flap which can be swung to and fro between two end positions about a pivot axis by means of a drive device, wherein the drive device has a drive shaft which is connected to the swing flap via an elbow lever, and at least one lever arm rigidly connected to the drive shaft is provided which is in operative connection with at least one operating cylinder for rotation of the drive shaft. The drive device has a motion link which is fastened so as to be rotatable about a pivot bearing, wherein the operating cylinder is connected to the motion link to pivot the same, and a transmission element is provided between the lever arm and the motion link in order to transmit the pivoting motion of the motion link to the drive shaft.

17 Claims, 9 Drawing Sheets

SHUT-OFF SYSTEM FOR LARGE CONDUIT CROSS-SECTIONS, HAVING A SWING FLAP

The invention relates to a shut-off system for large conduit cross-sections, having a swing flap which can be swung to and fro between two end positions about a pivot axis by means of a drive device, wherein the drive device has a drive shaft which is connected to the swing flap via an elbow lever, and at least one lever arm rigidly connected to the drive shaft is provided which is in operative connection with at least one operating cylinder for rotation of the drive shaft.

Shut-off systems of that kind are used especially in gas turbine systems and flue gas purification systems. To obtain a gas-tight seal, the large-format vanes have to be pressed against the stationary sealing surface with great pressure in the shut-off position. In addition, in the end positions, high pressure differences also have to be overcome. An elbow lever drive has proved especially suitable for swiveling the swing flap since, owing to the effect of the elbow lever, it is possible to produce high closing forces in the relevant end positions of the swing flap with relatively low driving torques.

When an elbow lever is used, it is advantageous to arrange the drive shaft as nearly as possible in the middle of the swing flap since in that way the effect of elbow lever in the end positions is at its best and the closing force at the periphery of the swing flap is approximately even. For a 90° pivoting movement of the swing flap, this requires, however, depending on space factors, a pivot angle of the drive shaft of from 160° to 200°.

If electric drives are used, a positioning angle of 180° is simple to achieve. Given the driving torques required for large shut-off equipment, however, such drives are very expensive to buy and, because of their high gear reduction, can be used only for long positioning times. In addition, for various applications it is not possible to use electric drives.

With hydraulic drives, which bring about the pivoting process by means of a cylinder and a lever, it is not possible, however, to achieve the necessary positioning angles of 180°. For that reason, double-piston drives with rack and pinion mechanisms have already been used.

In DE-A-41 35 182 and DE-A-40 33 663, double-piston drives with levers and corresponding valve control are used. These, however, are susceptible to failure, expensive to buy and require frequent maintenance.

In order to solve those problems, a solution was proposed in EP-A-0 707 176, in which the rotation axis of the drive shaft is shifted in the direction of the pivot axis of the swing flap to the extent that a turning angle of approximately 150° is obtained and thus the operation may still be carried out using simple hydraulic drives. Although that configuration results in a reduction in the turning angle of the drive shaft, it involves at the same time a reduction in the closing force acting on the swing flap. That can be compensated for only by increasing the driving torque, which, however, also entails more powerful drives and higher bending moments on the shaft and levers. It is precisely this that is problematical, however, at the high operating temperature of more than 600° C. and with the high pressure differences at the swing flap.

The object of the invention is therefore to avoid the disadvantages described above and to provide a shut-off system that makes it possible for positioning angles of more than 160° to be obtained using a simple, trouble-free and operationally reliable hydraulic drive.

According to the invention, that object is attained by means of the features as described hereafter.

The shut-off system according to the invention for large conduit cross-sections has a swing flap which can be swung to and fro between two end positions about a pivot axis by means of a drive device, wherein the drive device has a drive shaft which is connected to the swing flap via an elbow lever, and at least one lever arm rigidly connected to the drive shaft is provided which is in operative connection with at least one operating cylinder for rotation of the drive shaft. The drive device further has a motion link which is fastened so as to be rotatable about a pivot bearing, wherein the operating cylinder is connected to the motion link to pivot the same, and a transmission element is provided between the lever arm and the motion link in order to transmit the pivoting motion of the motion link to the drive shaft.

The drive device is advantageously so constructed that the rotational movement of the drive shaft between the two end positions of the flap is at least 160°, especially between 160° and 180°. In that case, the swing flap executes a pivoting movement between the two end positions of approximately 90°.

According to a further embodiment of the invention, the motion link is supported by its one end to be rotatable about the pivot bearing and is connected by its other end to the lever arm via the transmission element, the operating cylinder being coupled to a central region of the motion link.

Advantageously, the distance between the pivot axis of the swing flap and the rotation axis of the drive shaft is from 0.3 to 0.7, preferably from 0.4 to 0.6, times the width of the swing flap. In that manner, the elbow lever is able to act in the centre of the swing flap, thereby ensuring that the sealing force if evenly distributed over the periphery of the swing flap.

According to a first illustrative embodiment, the transmission element is formed by a linkage rod. The pivot bearing may in that case be constructed to be stationary or longitudinally displaceable. In the case of a longitudinally displaceable construction, the motion link further has a stop which limits the pivoting movement of the motion link and, as the stroke of the operating cylinder continues, causes displacement of the motion link and consequently a further increase in the magnitude of the turning movement of the drive shaft.

According to a further illustrative embodiment, the transmission element is constructed as a second operating cylinder, whereby the turning range of the drive shaft may similarly be increased.

Further advantages and embodiments of the invention will be described in detail below by means of a description of a number of illustrative embodiments and with reference to the drawings.

Figure 1:
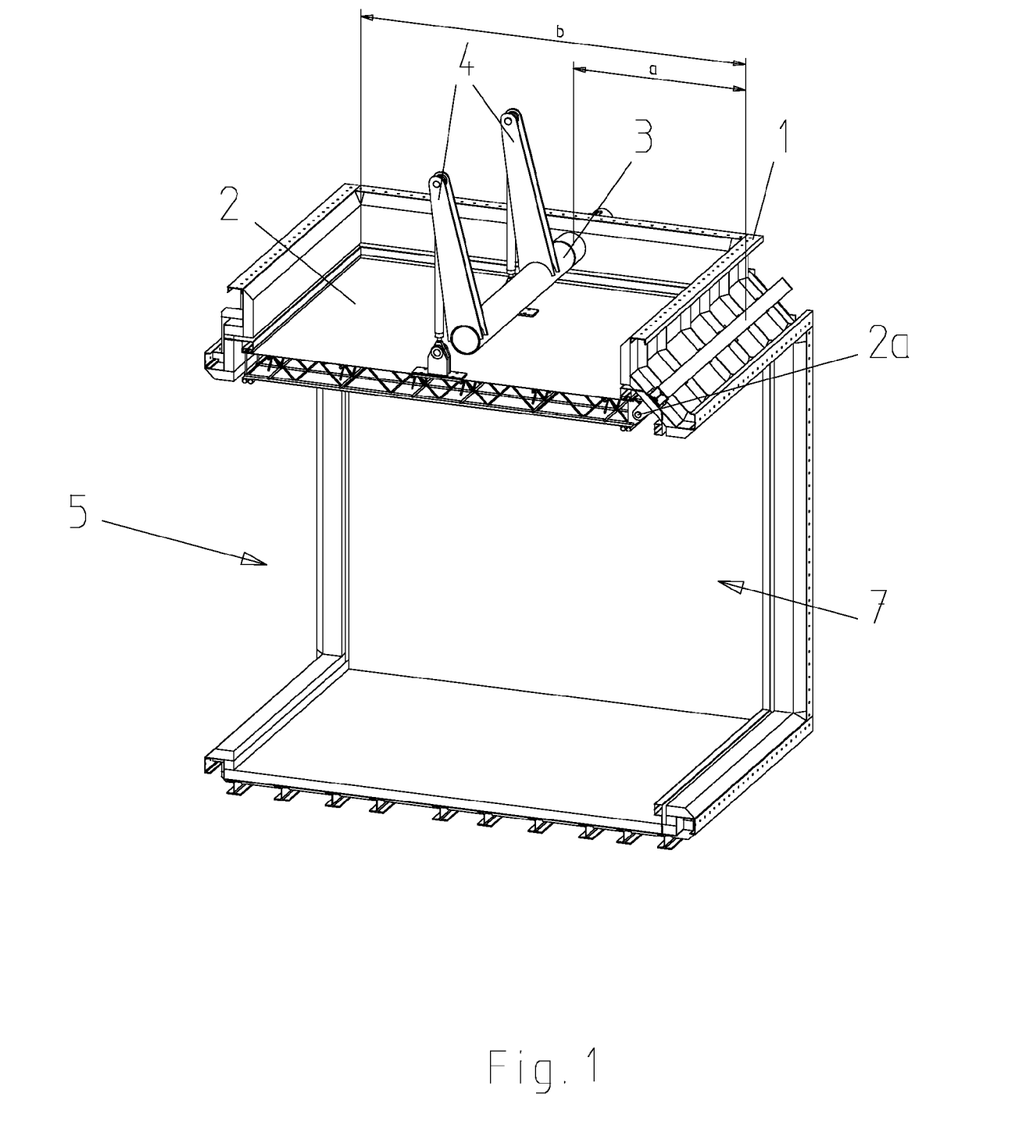
FIG. 1 is a partly sectional three-dimensional view of the shut-off system in a first end position of the swing flap.
Figure 2:
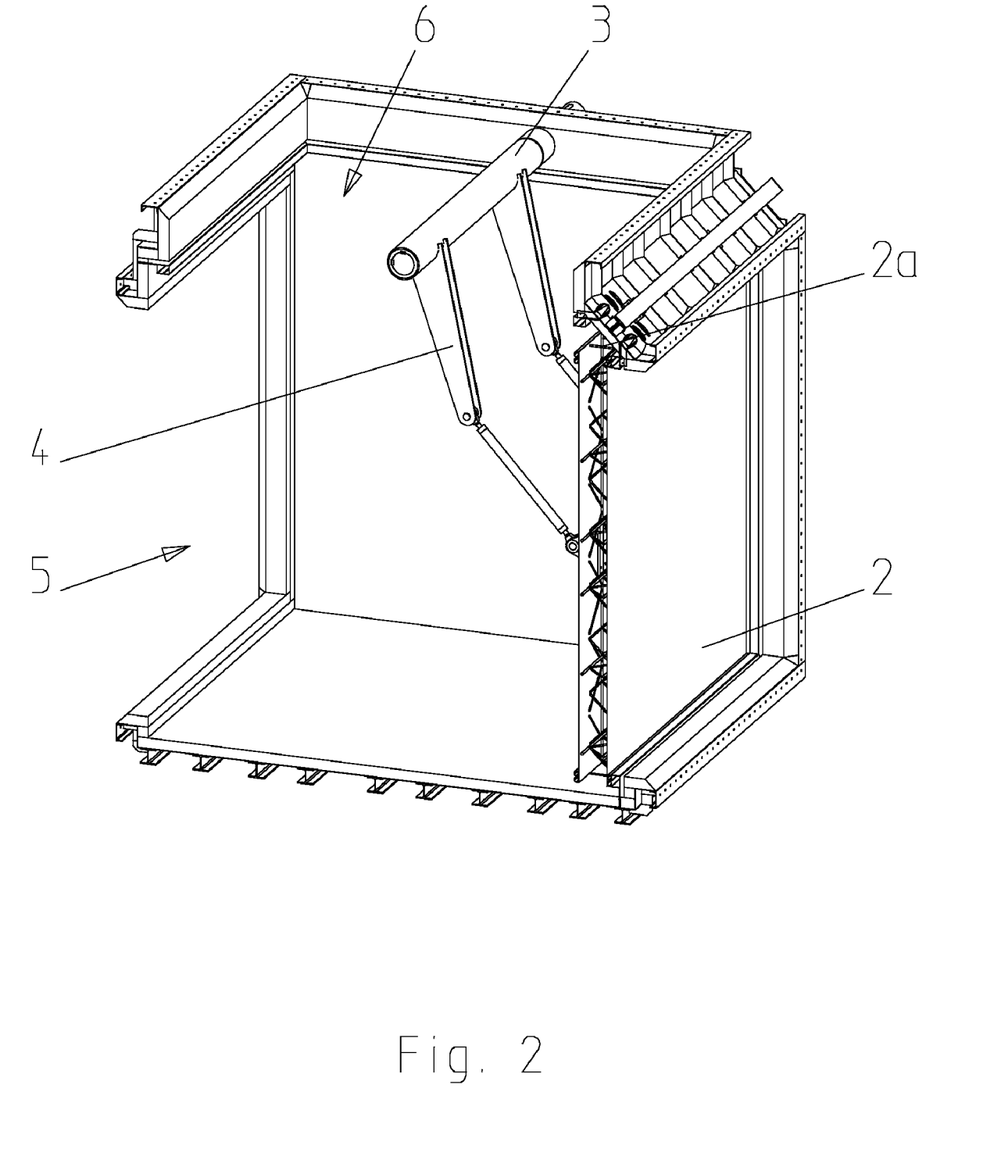
FIG. 2 is a partly sectional three-dimensional view of the shut-off system in a second end position of the swing flap.

The shut-off system illustrated in FIG. 1 and FIG. 2 exhibits a swing flap 2 which can be swung to and fro in a housing 1 about a pivot axis 2a between the first end position shown in FIG. 1 and the second end position shown in FIG. 2.

The pivoting movement is effected by means of a drive device having a drive shaft 3 which is connected to the swing flap by way of an elbow lever system 4. The housing 1 has three openings 5, 6 and 7, one of the two openings 5, 7 being closable by the swing flap 2 in each case.

The swing flap 2 may, for example, have a lattice structure in accordance with DE 44 46 395, which in the two end positions cooperates with sealing elements of suitable construction. The sealing elements may be constructed in this instance especially in accordance with EP-B-1 092 899.

Any reference in the present Application to a shut-off system for large conduit cross-sections means conduit cross-sections of more than 15 m$^2$, especially more than 20 m$^2$, or more than 40 m$^2$, respectively.

A drive device according to a first illustrative embodiment is described in detail below with reference to FIG. 3 to FIG. 5.

In addition to the drive shaft 3, the drive device has a lever arm 8 which is rigidly connected to the drive shaft. In addition, a motion link 9 is provided which by its one end is supported to be rotatable about a stationary pivot bearing 10 and by its other end is connected to the lever arm 8 via a transmission element 11 in the form of a linkage rod. In addition, an operating cylinder 12 is coupled in a central region of the motion link 9.

Both the pivot bearing 10 of the motion link 9 and the end support bearing 16 of the operating cylinder 12 are provided in the region of a mounting bracket 13 which is held rotatably on the drive shaft 3 by its one end and which is supported by its other end on the housing 1 via a linkage rod or a shock absorber 14. It is also conceivable, however, for an energy storing device, especially a spring, to be provided which is pre-loaded in the end position and in that manner compensates for changes in position caused, for example, by thermal expansion.

The motion link 9 and the operating cylinder 12 may also be directly supported on the housing. The provision of the mounting bracket 13 has the advantage, however, that the swing flap 2 can be adjusted in a simple manner in its end positions during mounting.

Figure 3:
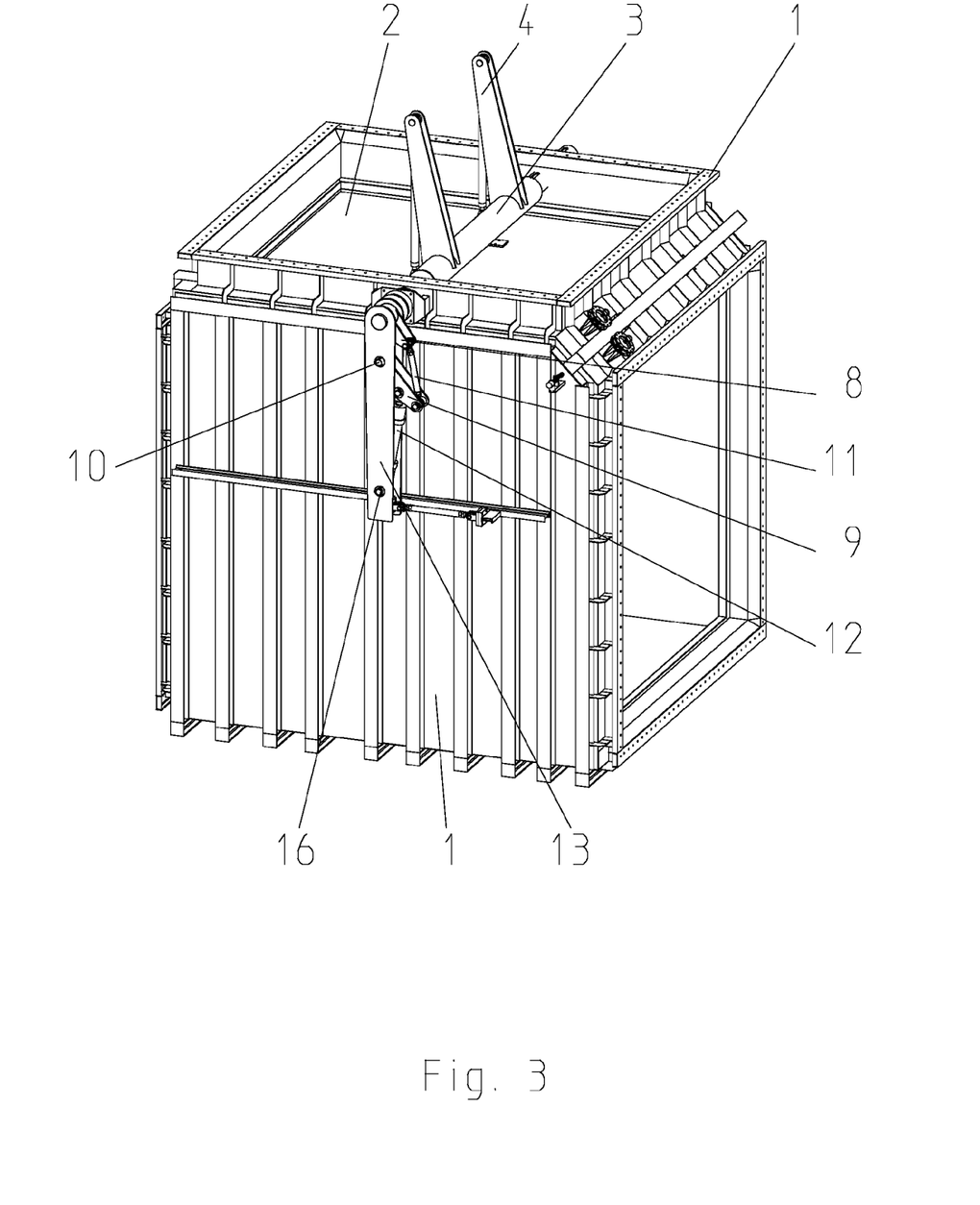
FIG. 3 is a three-dimensional illustration of the shut-off system having a drive device according to a first illustrative embodiment, the swing flap being in a first end position.
Figure 4:
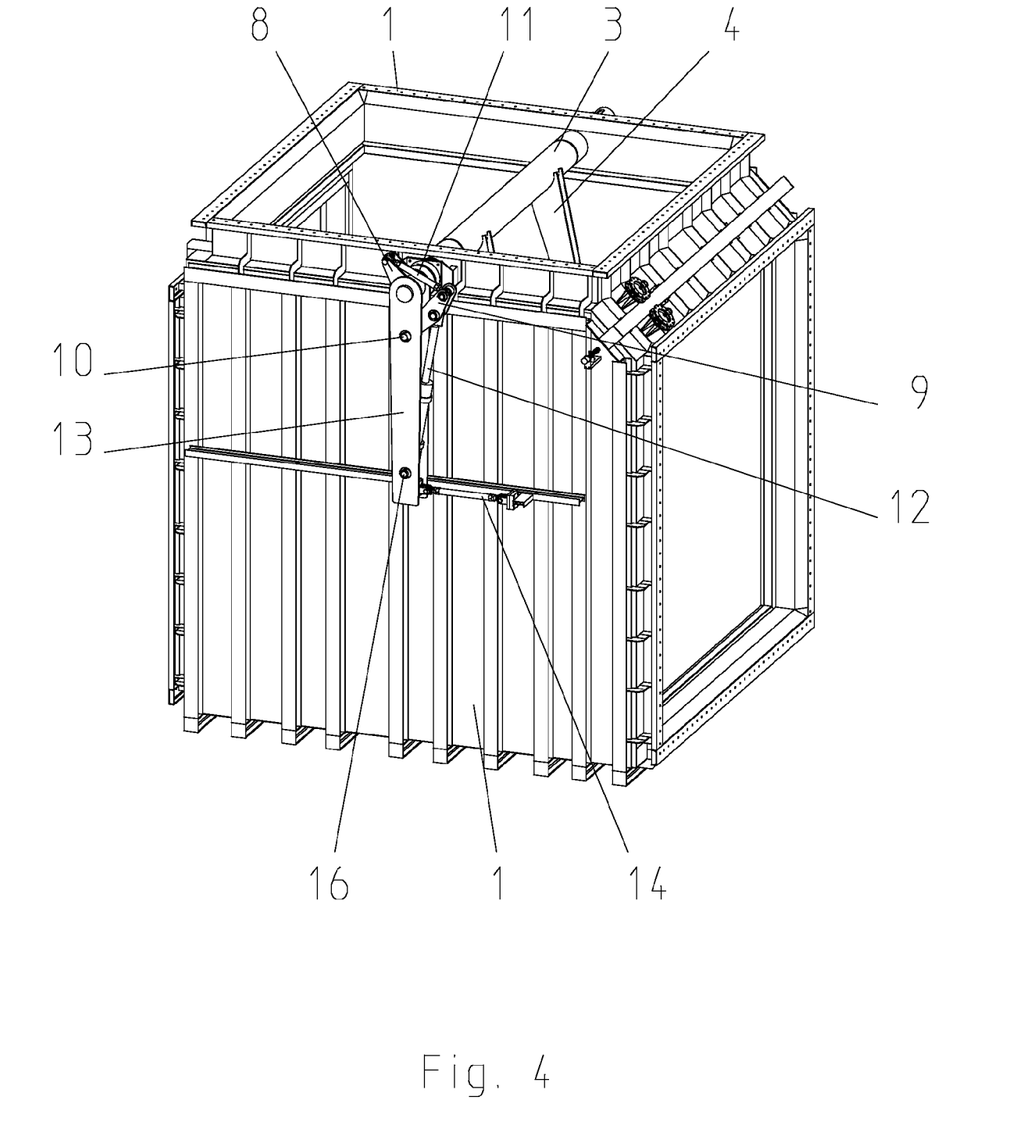
FIG. 4 is a three-dimensional illustration of the shut-off system having the drive device shown in FIG. 3, the swing flap being in a second end position.

In FIG. 3 and FIG. 4, the two extreme positions of the drive device are shown.

Figure 5:
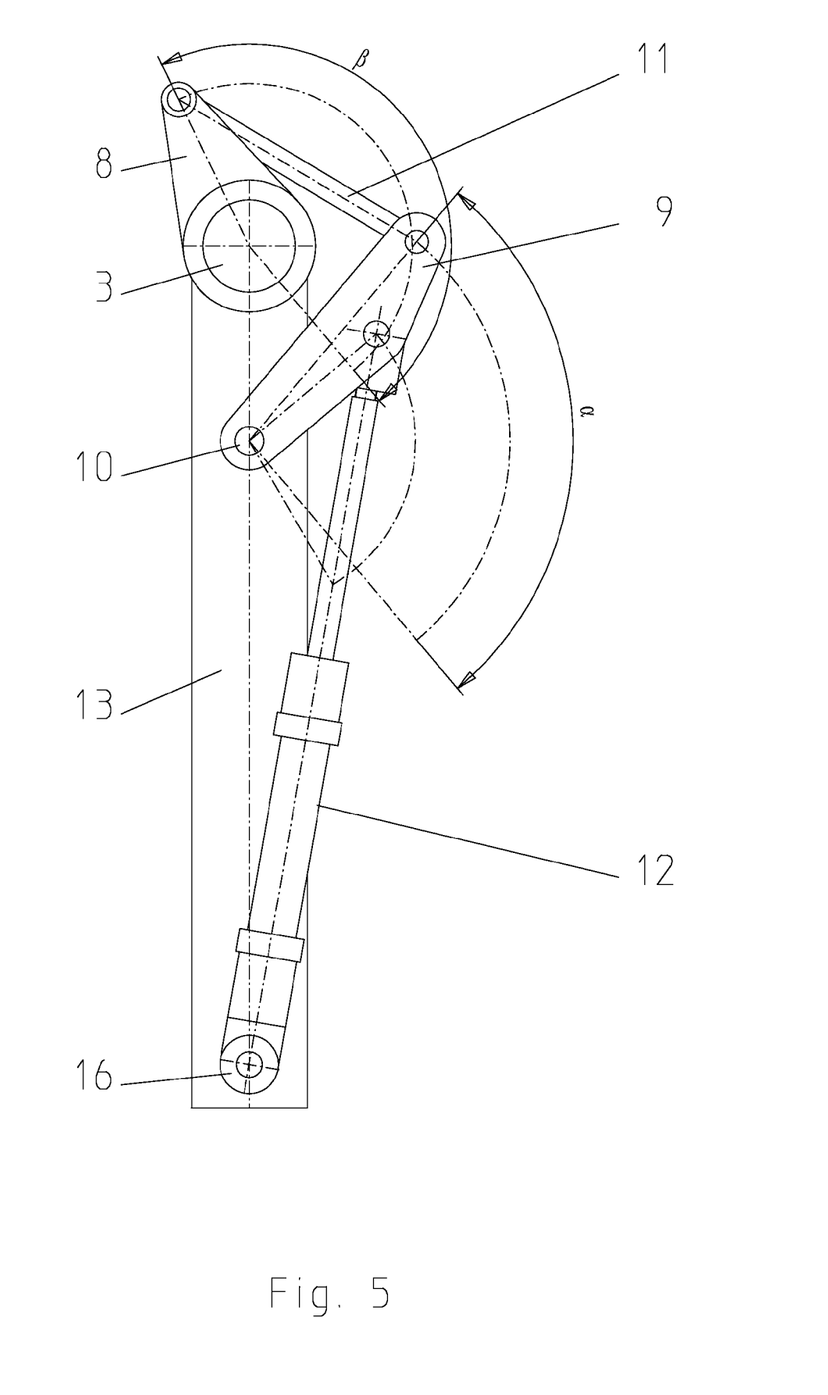
FIG. 5 is a side view of the drive device in the position shown in FIG. 4, FIGS. 6a to 6c are side views of a drive device according to a second illustrative embodiment, in various positions.

It becomes clear from FIG. 5 that, in the illustrative embodiment shown, the operating cylinder 12 makes it possible for the motion link 9 to pivot about the pivot bearing 10 by an angle α of approximately 100°. By means of the coupling of the motion link 9 to the lever arm 8 via the transmission element 11, there is then obtained for the lever arm 8 and hence for the drive shaft 3 a pivoting range β of more than 160°. In the illustrative embodiment shown, the pivoting range is approximately 166°. This illustrative embodiment is suitable especially for pivoting movements in the range of from 160° to less than 180°. It requires only a single hydraulic cylinder and thus affords a simple, trouble-free and operationally reliable hydraulic drive.

Figure 6A:
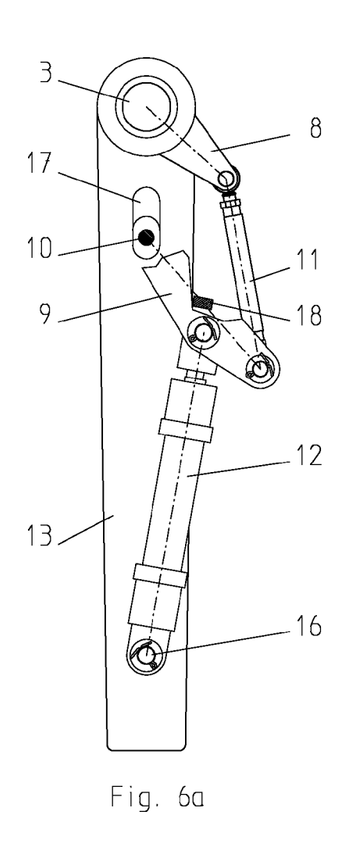
Figure 6B:
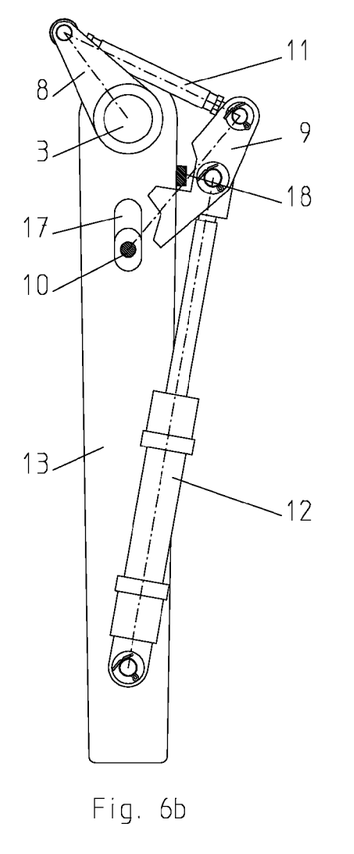
Figure 6C:
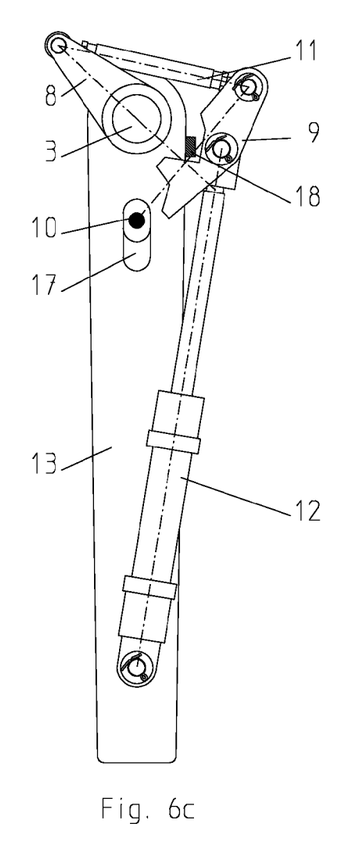

FIGS. 6a to 6c show in detail a second illustrative embodiment of the drive system, which differs from the first illustrative embodiment in the respect that the pivot bearing 10 of the motion link 9 is received in a longitudinally displaceable manner in a slot 17. The motion link further has a stop 18 which limits the pivoting movement of the motion link 9 by coming into contact with the mounting bracket 13 or another abutment after a pivoting movement of the motion link 9 (see FIGS. 6a and 6b). As the stroke of the operating cylinder 12 continues, displacement of the motion link 9 together with the pivot bearing 10 then occurs (see FIGS. 6b and 6c). The displacement is limited by the length of the slot 17. In place of the stop 18 and a slide block it would also be possible, however, for rollers to be used.

Figure 7:
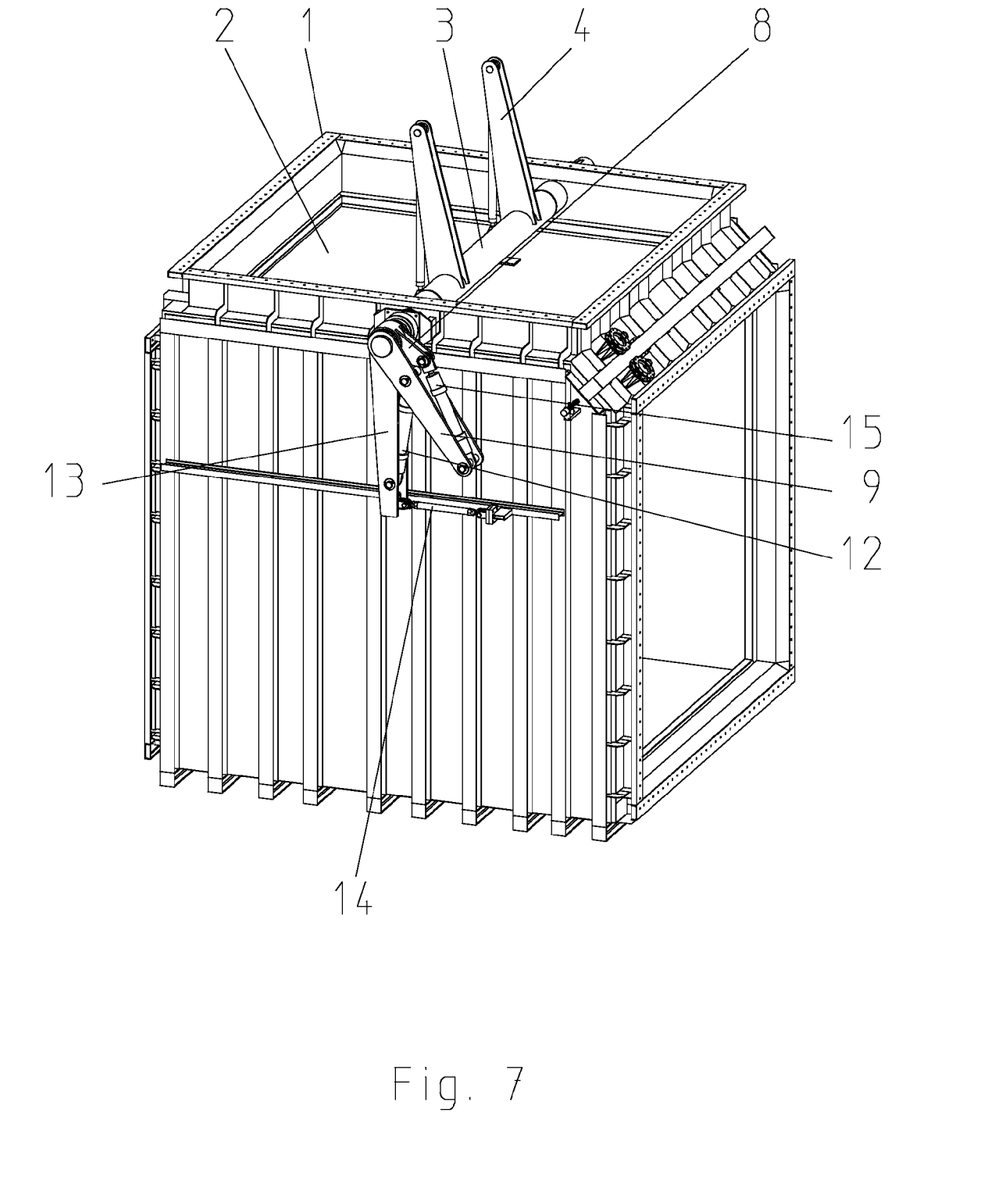
FIG. 7 is a three-dimensional illustration of the shut-off system having a drive device according to a third illustrative embodiment, the swing flap being in a first end position.
Figure 8:
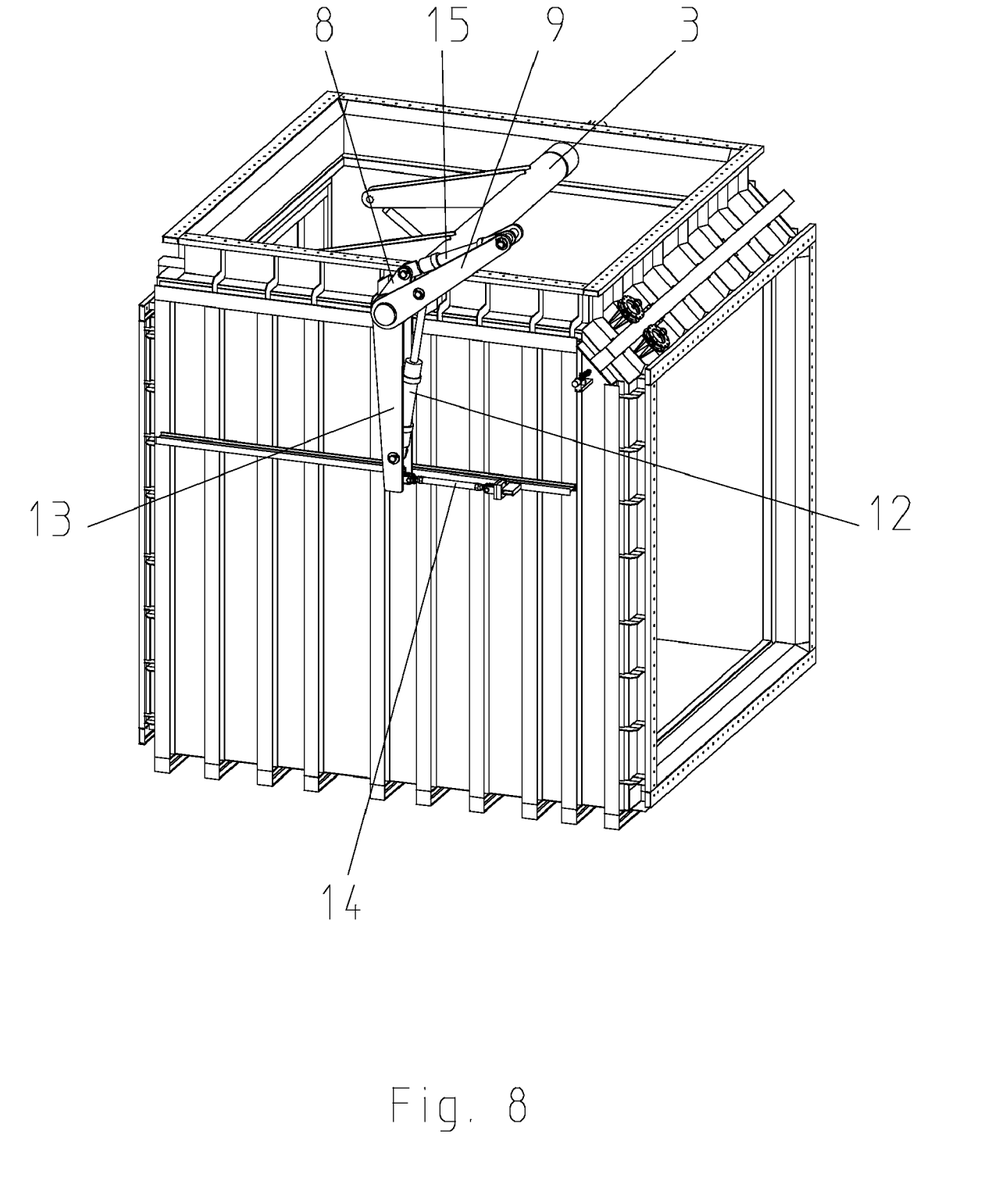
FIG. 8 is a three-dimensional illustration of the shut-off system having the drive device shown in FIG. 7, the swing flap being in a middle position.
Figure 9:
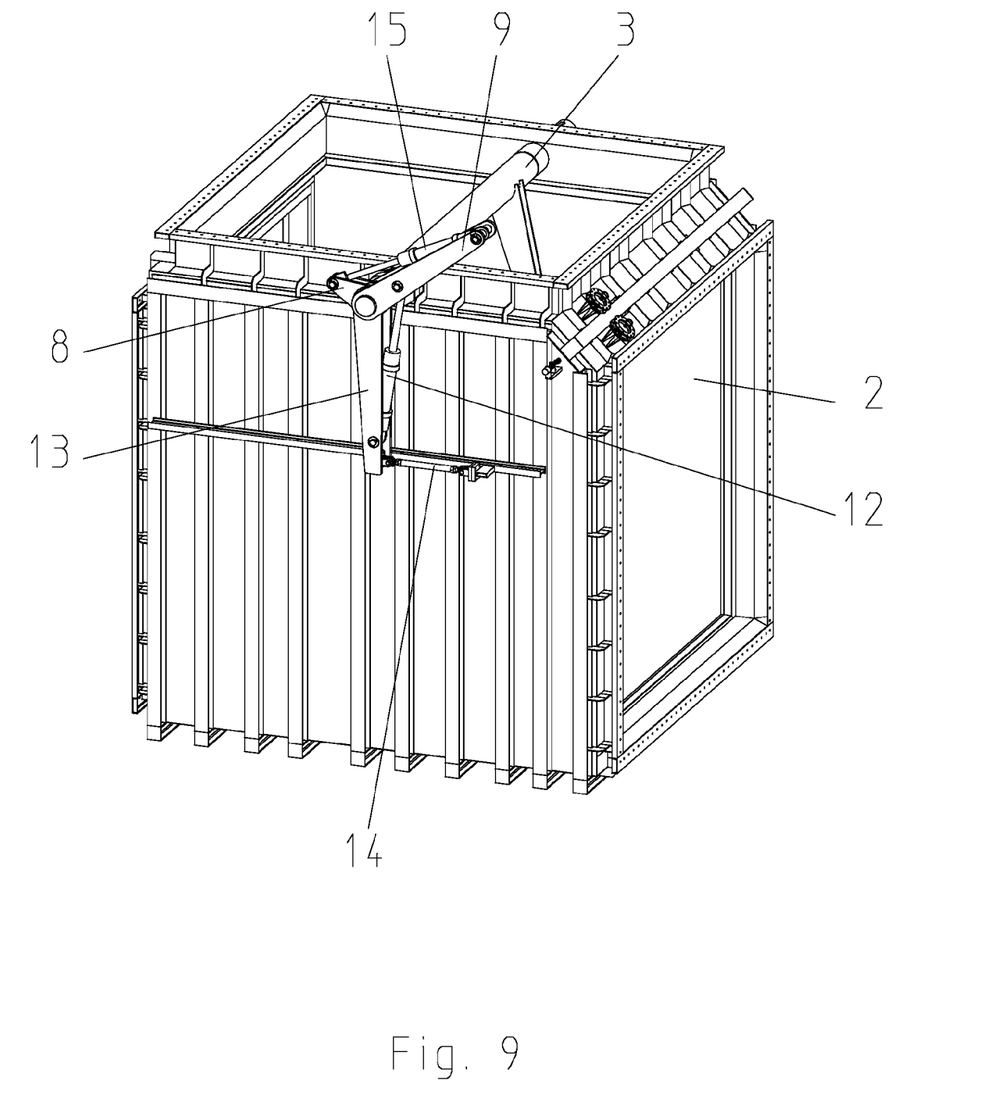
FIG. 9 is a three-dimensional illustration of the shut-off system having the drive device shown in FIG. 7, the swing flap being in a second end position.

To increase the pivoting range of the drive shaft 3 still further, in the third illustrative embodiment shown in FIG. 7 to FIG. 9 the transmission element 11 is constructed as a second operating cylinder 15.

The two operating cylinders 12, 15 are so coordinated with each other that first the operating cylinder 12 causes rotation of the motion link 9, with the lever arm executing a rotational movement of approximately 90°. Only when the operating cylinder 12 is fully extended does the second operating cylinder 15 travel from the position shown in FIG. 8 to the position of FIG. 9. In the process, the lever arm 8 once again executes a rotational movement of approximately 90°, and therefore the total pivoting range of the lever arm 8 is approximately 180° or more.

The operating cylinder 12 is advantageously constructed to have a greater effective piston diameter than the second operating cylinder 15, the two operating cylinders being arranged parallel to each other. In that manner, the two operating cylinders may be connected to each other and at the same time acted upon by the same pressure. Owing to the greater effective piston diameter of the first operating cylinder 12, this results first in extension of the operating cylinder 12 and only thereafter in actuation of the second operating cylinder 15. The advantage of this arrangement is that, in the middle positioning range, owing to the lever ratios the utilisation of the operating cylinders is very good, which in turn results in high positioning torques. This is especially advantageous in the case of high flow speeds, that is to say under high dynamic loads.

That construction and coupling of the two operating cylinders 12, 15 results in turn in a very simple, trouble-free and operationally reliable hydraulic drive, it being possible to dispense with a corresponding valve control.

Whereas, in the first two illustrative embodiments, the motion link 9 is supported on the mounting bracket at a distance from the drive shaft 3, in the third illustrative embodiment the motion link 9 is supported to be rotatable about the drive shaft 3.

As can be seen especially in FIG. 1 and FIG. 2, the drive shaft is situated approximately in the middle of the swing flap. The distance a between the pivot axis 2a of the swing flap 2 and the rotation axis of the drive shaft 3 is in the range of from 0.3 to 0.7, preferably from 0.4 to 0.6, times the width b of the swing flap 2 (see FIG. 1).

The invention claimed is:

1. A shut-off system for large conduit cross-sections, comprising:
    a swing flap which can be swung to and fro between two end positions about a pivot axis by a drive device which moves the swing flap between the two end positions,
    the drive device having
        a drive shaft which is connected to the swing flap via an elbow lever system,
        at least one lever arm rigidly connected to the drive shaft which is in operative connection with at least one operating cylinder for rotation of the drive shaft,
        a motion link which is fastened so as to be rotatable about a pivot bearing, wherein the at least one operating cylinder comprises a first operating cylinder, the first operating cylinder connected to the motion link to pivot the motion link about the pivot bearing, a transmission element provided between the lever arm and the motion link in order to transmit the pivoting motion of the motion link to the drive shaft, and the pivot bearing being longitudinally displaced toward and away from the drive shaft.

2. A shut-off system according to claim 1, wherein a rotational movement of the drive shaft between the two end positions of the swing flap is at least 160°.

3. A shut-off system according to claim 1, wherein the swing flap executes a pivoting movement between the two end positions of approximately 90°.

4. A shut-off system according to claim 1, wherein the motion link is supported by a first end to be rotatable about the pivot bearing and is connected by a second end to the lever arm via the transmission element, and wherein the first operating cylinder is coupled to a central region of the motion link.

5. A shut-off system according to claim 1, wherein the distance between the pivot axis of the swing flap and the rotation axis of the drive shaft is in the range of from 0.3 to 0.7 times the width of the swing flap.

6. A shut-off system according to claim 1, wherein the transmission element is formed by a linkage rod.

7. A shut-off system according to claim 1, wherein the pivot bearing is longitudinally displaced in a slot.

8. A shut-off system according to claim 1, wherein the motion link further has a stop which limits the pivoting movement of the motion link and, as the stroke of the first operating cylinder continues, causes displacement of the motion link and the longitudinal displacement of the pivot bearing.

9. A shut-off system according to claim 1, wherein the at least one operating cylinder comprises a secondary operating cylinder and the transmission element is formed by the second operating cylinder which increases the turning range of the drive shaft.

10. A shut-off system according to claim 9, wherein the first operating cylinder has a greater effective piston diameter than the second operating cylinder, and the two operating cylinders are arranged parallel to each other.

11. A shut-off system according to claim 10, wherein the two operating cylinders are fluidly connected to each other so that both operating cylinders are always acted upon simultaneously by the same pressure.

12. A shut-off system according to claim 1, wherein the first operating cylinder is connected by a first end to the motion link and is supported by a second end on a mounting bracket, which mounting bracket is held so as to be rotatable at a first end and is supported at a second end on a housing frame.

13. A shut-off system according to claim 12, wherein both the pivot bearing and the motion link and an end support bearing of the operating cylinder are provided on the mounting bracket.

14. A shut-off system according to claim 12, wherein the mounting bracket is supported on the housing frame via one of a linkage rod, a shock absorber or an energy storing device.

15. A shut-off system according to claim 13, wherein the mounting bracket is supported on the housing frame via one of a linkage rod, a shock absorber or an energy storing device.

16. A shut-off system according to claim 2, wherein the rotational movement of the drive shaft between the two end positions of the swing flap is between 160° and 180°.

17. A shut-off system according to claim 5, wherein the distance between the pivot axis of the swing flap and the rotation axis of the drive shaft is in the range of from 0.4 to 0.6 times the width of the swing flap.

* * * * *